(No Model.)
J. F. KETTER.
TWO WHEELED VEHICLE.
No. 492,984. Patented Mar. 7, 1893.
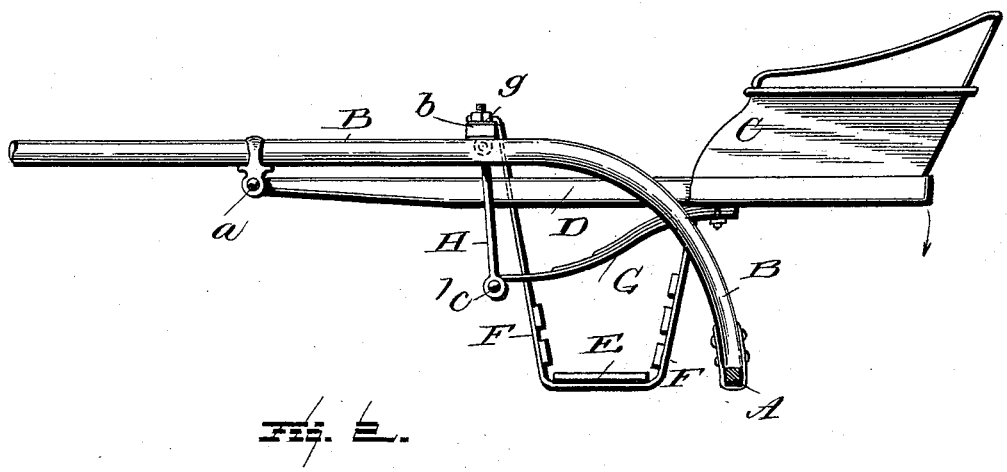
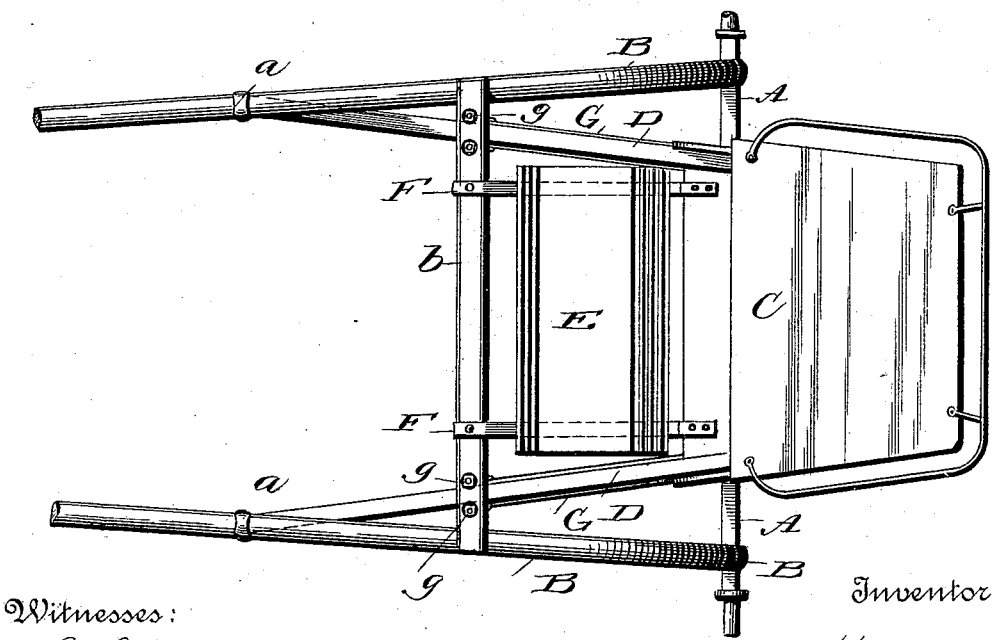
Witnesses:
L. C. Hills.
E. H. Bond.
Inventor:
John F. Ketter.
By E. B. Stocking
Attorney

UNITED STATES PATENT OFFICE.

JOHN F. KETTER, OF IRONTON, OHIO.

TWO-WHEELED VEHICLE.

SPECIFICATION forming part of Letters Patent No. 492,984, dated March 7, 1893.

Application filed November 26, 1892. Serial No. 453,268. (No model.)

*To all whom it may concern:*

Be it known that I, JOHN F. KETTER, a citizen of the United States, residing at Ironton, in the county of Lawrence, State of Ohio, have invented certain new and useful Improvements in Two-Wheeled Vehicles, of which the following is a specification, reference being had therein to the accompanying drawings.

This invention relates to certain new and useful improvements in road carts or two wheeled vehicles, and it has for its objects among others to provide a simply constructed, cheap and durable road cart, which will be easy riding, not liable to be broken in passage over heavy and rough roads and in which the so-called "horse motion" is done away with. The side bars are pivotally connected at their forward ends with the shafts, and springs are secured to the under side of the body and pivotally connected with hangers on the cross bar of the shafts, which hangers form guides for the side bars in their movements.

Other objects and advantages of the invention will hereinafter appear and the novel features thereof will be specifically defined by the appended claims.

The invention is clearly illustrated in the accompanying drawings, which, with the letters of reference marked thereon, form a part of this specification, and in which Figure 1 is a side elevation of a vehicle embodying my invention. Fig. 2 is a plan thereof.

Like letters of reference indicate like parts in both of the views.

Referring now to the details of the drawings by letter, A designates the axle and B the shafts, which may be of any approved or well-known construction.

C is the vehicle body which may be of any desired form and D are the horizontal side-bars or seat-bars secured to the body in any well-known manner and inclining outward as they approach the shafts to the under side of which they are hinged or pivoted in any suitable way, as seen at a; this connection should be at some distance in front of the cross bar b of the shafts as shown in both of the figures of the drawings.

E is a foot rest supported on the rods or bars F which are secured to the under side of the body and to the cross bar b of the shafts.

G are springs preferably leaf springs as seen in Fig. 1, secured at their rear ends to the under side of the body portion C preferably substantially in vertical line with the axle, and the forward ends of these springs are pivotally connected with the horizontal pin c held in the lower ends of the hangers H which are passed through the cross bar of the shafts as shown and which are rendered vertically adjustable by the nuts g upon the upper ends thereof. These hangers loosely embrace the seat bars D and serve to guide the same in their vertical movements. It will be observed that by this construction the body is entirely yieldingly supported and that the pivotal connection between seat bars and the shafts and between the forward ends of the short springs and the hangers which are supported from the shafts provides that ease of movement which prevents the sudden jar occasioned by the vehicle passing over obstructions.

What I claim as new is—

1. The combination with the axle and shafts, of a vehicle body having longitudinal bars pivotally connected with the shafts, hangers vertically adjustably supported from the cross-bar of the shafts and forming guides for the said bars, and springs connected at one end to the body and at the other end pivotally connected with the hangers, substantially as specified.

2. The combination with the axle and shafts, of a vehicle body having bars pivotally connected with the shafts, hangers adjustably connected with the cross-bar of the shafts, pins held in the lower ends of said hangers, and springs pivotally supported at their forward ends on said pins and at their rear ends secured to the under side of the body substantially in vertical line with the axle, as and for the purpose specified.

In testimony whereof I affix my signature in presence of two witnesses.

JOHN F. KETTER.

Witnesses:
R. B. MILLER,
JON. MORRIS.